US009741062B2

(12) United States Patent
Goldberg et al.

(10) Patent No.: US 9,741,062 B2
(45) Date of Patent: Aug. 22, 2017

(54) SYSTEM FOR COLLABORATIVELY INTERACTING WITH CONTENT

(75) Inventors: David Goldberg, Palo Alto, CA (US); Nicolas B. Ducheneaut, Sunnyvale, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 1214 days.

(21) Appl. No.: 12/427,693

(22) Filed: Apr. 21, 2009

(65) Prior Publication Data
US 2010/0269054 A1 Oct. 21, 2010

(51) Int. Cl.
*G06F 3/048* (2013.01)
*G06Q 30/06* (2012.01)

(52) U.S. Cl.
CPC ..... *G06Q 30/0603* (2013.01); *G06Q 30/0601* (2013.01)

(58) Field of Classification Search
USPC ........................................ 715/757, 764, 771
See application file for complete search history.

(56) References Cited

U.S. PATENT DOCUMENTS

| | | | | | |
|---|---|---|---|---|---|
| 4,539,585 | A * | 9/1985 | Spackova | ............... | A41H 3/007 348/77 |
| 5,680,528 | A * | 10/1997 | Korszun | ................. | G06T 11/00 345/630 |
| 5,850,222 | A * | 12/1998 | Cone | ............................. | 345/418 |
| 6,633,289 | B1 * | 10/2003 | Lotens et al. | .................. | 345/419 |
| 6,901,379 | B1 * | 5/2005 | Balter | ................ | G06Q 30/0643 434/395 |
| 7,328,119 | B1 * | 2/2008 | Pryor | ..................... | A63B 71/06 128/920 |
| 7,849,393 | B1 * | 12/2010 | Hendricks | ............ | H04N 5/4401 715/203 |
| 2001/0026272 | A1 * | 10/2001 | Feld | ........................ | A41H 3/007 345/419 |
| 2005/0052461 | A1 * | 3/2005 | Vassilev et al. | ............... | 345/473 |
| 2006/0026521 | A1 * | 2/2006 | Hotelling | .............. | G06F 3/0418 715/702 |
| 2006/0054689 | A1 * | 3/2006 | Omino | ................... | G06Q 20/32 235/380 |
| 2007/0262863 | A1 * | 11/2007 | Aritsuka | ................ | H04B 17/27 340/539.22 |

(Continued)

*Primary Examiner* — Kevin L Young
*Assistant Examiner* — Haimei Jiang
(74) *Attorney, Agent, or Firm* — Shun Yao; Park, Vaughan, Fleming & Dowler LLP

(57) ABSTRACT

Embodiments of a system, a method, and a computer-program product (e.g., software) that facilitates collaborative interaction with content by multiple users are described. In this system, users of a distributed group of dedicated electronic devices provide signals that indicate their current actions as they view the content. Using these signals, the system provides additional signals for display on the group of electronic devices. These additional signals provide an environment that includes the content and the current user actions, which allows the users to collaboratively interact with the content and with each other. Moreover, the multiple users may be dynamically aggregated based on their actions, which allows a social network to be established and dynamically maintained based on user activities and interests.

20 Claims, 5 Drawing Sheets

(56) References Cited

U.S. PATENT DOCUMENTS

| | | | |
|---|---|---|---|
| 2007/0277121 A1* | 11/2007 | Beckman | G06F 3/0485 715/847 |
| 2008/0125289 A1* | 5/2008 | Pryor | A63B 71/06 482/8 |
| 2008/0151092 A1* | 6/2008 | Vilcovsky | G02B 5/08 348/333.01 |
| 2008/0252596 A1* | 10/2008 | Bell et al. | 345/156 |
| 2008/0297515 A1* | 12/2008 | Bliss | H04M 1/72544 345/473 |
| 2009/0186700 A1* | 7/2009 | Konkle | A63F 13/87 463/42 |
| 2009/0222127 A1* | 9/2009 | Lind | A41H 3/007 700/132 |
| 2010/0066850 A1* | 3/2010 | Wilson | H04N 17/04 348/222.1 |
| 2010/0188397 A1* | 7/2010 | Tsai | G06F 1/1626 345/419 |
| 2010/0190610 A1* | 7/2010 | Pryor | A63B 71/06 482/8 |
| 2010/0235886 A1* | 9/2010 | Muller | G06Q 30/02 726/4 |
| 2011/0107263 A1* | 5/2011 | Ivanov | G06Q 10/087 715/823 |

* cited by examiner

SYSTEM FOR COLLABORATIVELY INTERACTING WITH CONTENT

BACKGROUND

Field

The present disclosure relates to a system and technique that facilitates collaborative interaction with content by multiple users.

Related Art

While many people enjoy shopping, visiting multiple stores at different locations or wandering through a mall can be time-consuming and physically demanding. In addition, there is no guarantee that a given merchant will have a desired item in stock.

Catalogues and online websites attempt to address these problems by providing customers ready access to a variety of products in one document. However, these shopping formats often degrade the overall customer experience. For example, it is often difficult to convey the look and feel of a particular product, such as an article of clothing, using images in a catalogue or on a website. Furthermore, because it is often difficult for customers to interact with each other when viewing catalogues and websites, these shopping formats often restrict the social aspects of shopping (such as the equivalent of a group of friends going to the mall together), which can also degrade the customer experience.

Hence, what is needed is a method and a system that facilitates an enhanced customer experience while shopping, and more generally, while collaboratively interacting with content, without the problems listed above.

SUMMARY

One embodiment of the present disclosure provides a system that facilitates collaborative interaction with content by multiple users of a networked group of electronic devices. During operation, the system receives first signals corresponding to current user actions of a given user of a given electronic device, and other users of other electronic devices in the group of electronic devices. These current user actions may correspond to collaborative interaction with the content by the users via the group of electronic devices. Then, the system may display updates to the content in response to the collaborative interaction on the group of electronic devices based at least in part on the first signals.

Note that the electronic devices in the group of electronic devices are not owned by the users and are not used by the users at their places of employment. Furthermore, the multiple users may be at different locations and/or the content may be remotely located from the group of electronic devices. Additionally, the first signals may be received at the given electronic device and/or at each of the electronic devices in the group of electronic devices.

Moreover, the group of users may be dynamically assembled as the given user interacts with the content.

In some embodiments, the electronic devices in the group of electronic devices are provided at dedicated facilities that are used for collaboratively interacting with the content. These dedicated facilities may include commercial movie theaters and/or video conference facilities. Alternately or additionally, the electronic devices in the group of electronic devices may be provided in retail establishments. For example, the electronic devices may be located in kiosks.

A variety of user actions may be received, including: inputs by the users using environmental controls; and/or motion of one or more of the users.

Furthermore, displaying the updates to the content may involve displaying a multi-dimensional virtual environment into which a representation corresponding to at least one of the users is projected. For example, the content may include a clothing item or accessory, and the representation may illustrate how the clothing item or accessory will appear when worn by at least one of the users.

More generally, the content may include: shopping information, items in a museum, travel information, and/or sensory information in addition to visual information.

In some embodiments, the system includes a computer system, such as a networked computer system.

Another embodiment provides a method including at least some of the above-described operations.

Another embodiment provides a computer-program product for use in conjunction with the computer system.

BRIEF DESCRIPTION OF THE FIGURES

Note that like reference numerals refer to corresponding parts throughout the drawings.

DETAILED DESCRIPTION

The following description is presented to enable any person skilled in the art to make and use the disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not intended to be limited to the embodiments shown, but is to be accorded the widest scope consistent with the principles and features disclosed herein.

Embodiments of a system, a method, and a computer-program product (e.g., software) that facilitates collaborative interaction with content by multiple users are described. In this system, users of a distributed group of dedicated electronic devices provide signals that indicate their current actions as they view the content. Using these signals, the system provides additional signals for display on the group of electronic devices. These additional signals provide an environment that includes the content and the current user actions, which allows the users to collaboratively interact with the content and with each other. Moreover, the multiple users may be dynamically aggregated based on their actions, which allows a social network to be established and dynamically maintained based on user activities and interests.

By facilitating collaborative interaction among the users and with the content (such as with merchandise while shopping), the system may enhance the overall user experience. In particular, this system may allow a given user to conveniently view content from multiple content providers (such as multiple retailers) from a single location using one of the electronic devices. Moreover, the electronic devices may each include a high resolution display and may provide high-bandwidth communication with the content providers. In conjunction with interactive environmental controls, these features of the electronic devices may convey the look and feel of the content, for example, by showing the given user how an article of clothing will look on them. Furthermore, the dynamic interaction among the users allows the social aspects of activities, such as shopping, to be supported by the system.

In the discussion that follows, merchandise offered by retailers is used as an illustrative example of the content, and shopping is used as an illustrative example of the collaborative interaction with this content among one or more users. However, it should be understood that the electronic devices and the system may be used with a wide variety of content (such as that offered by museums, travel agents, etc.) to provide many different types of collaborative interaction with content among one or more users (such as a virtual museum, a virtual preview of a vacation, etc.).

Figure 1:
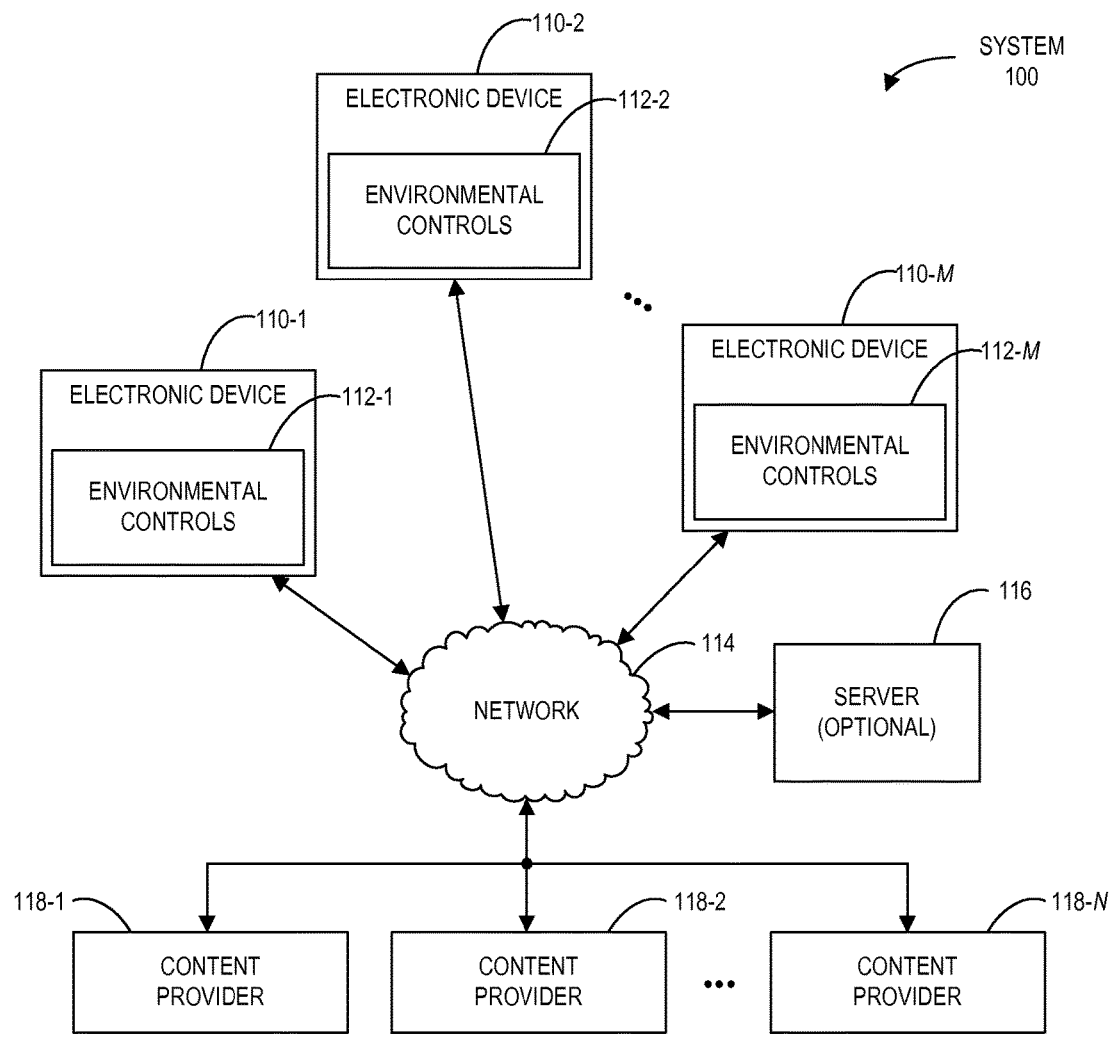
FIG. 1 is a block diagram illustrating a system that includes a networked group of electronic devices in accordance with an embodiment of the present disclosure.

We now discuss embodiments of a system that facilitates collaborative interaction with content by multiple users. FIG. 1 presents a block diagram illustrating a system 100 that includes a networked group of electronic devices 110. During operation of this system, multiple users of electronic devices 110 may collaboratively interact with content, which is provided by content providers 118 (such as retailers), and which is displayed on electronic devices 110. In particular, a given user of one of electronic devices 110, such as electronic device 110-1, may access content from one or more of content providers 118 via network 114. This content may be presented to this user on a high-resolution display on electronic device 110-1, for example, a display that has a resolution and/or a display size that is larger than those of high-definition television screens or typical desktop/laptop computer displays. More generally, electronic devices 110 may provide additional sensory information associated with the content, such as sounds, smells, and/or haptic or tactile information (such a texture information for an article of clothing). Thus, electronic devices 110 may provide sensory environments that enhance the users' sensory experience when interacting with the content.

For example, the content may be presented to the users of electronic devices 110 as part of a virtual environment, such as a two-dimensional or a three-dimensional virtual reality, into which representations corresponding to one or more the users are projected. This virtual environment may be presented to the users using: a heads-up display, a helmet or goggles, and/or a tactile interface (such as a glove). Moreover, the virtual environment may be presented to the users using displays on more than one surface, such as in an immersive Cave Automatic Virtual Environment (CAVE). Additionally, electronic devices 110 may monitor the users' motions (which constitute one type of user actions or inputs), and changes in the users' positions may be reflected by their corresponding representations in the virtual environment.

In some embodiments, this approach is used to illustrate how a clothing item or accessory will appear when worn by at least the one of the users, and to show the user (in the virtual environment) how the clothing item or the accessory looks as the user bends and moves around. This approach may be useful in allowing the user to get a better appreciation for a product that is remotely located from electronic device 110-1, and even for a product that is currently out of stock. For example, using one of electronic devices 110, a potential customer at an automotive dealership may be able to view a car make and model, and even experience a virtual test drive, prior to having the car dealer order or trade for the vehicle.

Furthermore, the communication bandwidth associated with network 114 may be higher than that offered on most of the users' personal or work computers. Using interactive environmental controls 112, the users may be able to quickly navigate through and modify the content that they are viewing. In general, the displayed environment on electronic devices 110 may respond to a wide variety of user inputs, including: commands received using environmental controls 112 from one or more users, motion of one or more the users, and/or verbal instructions from one or more of the users. In conjunction with the high-resolution visual and additional sensory information, system 100 may therefore facilitate an enhanced overall user experience when interacting with the content.

Because electronic devices 110 are coupled via network 114, the users may also be able to interact with each other while they are viewing the content. In some embodiments, predefined groups of users may go to dedicated locations that include the electronic devices 110. In this way, the group of users may collaboratively interact with the content and with each other. For example, a group of friends at different locations may arrange to go shopping together using electronic devices 110. This may be facilitated using a social networking website, which is used to identify a group of users with common interests, who then decide to go shopping together using system 100.

However, in other embodiments, system 100 may dynamically aggregate the users (so that they can interact with each other) as these users interact with the content. For example, based at least in part on a user's actions (which presumably reflect this user's interests or tastes), such as commands provided using environmental controls 112-1 and/or motion of the user, system 100 may associate this user with other users. Then, system 100 may add this user to an interacting group of users, which includes the other users. In this group, the users may be able to view each others' actions and activities as they navigate through the content. Moreover, the users in the group may be able to communicate with each other. Thus, whether the group of users is predefined or is dynamically aggregated, system 100 may facilitate the social aspects of shopping.

Note that electronic devices 110 may be at the same location (for example, in different rooms in a facility) and/or at multiple (different) locations in system 100. Moreover, in order to provide high-resolution, high-bandwidth interaction with the content, electronic devices 110 may not be owned by the users and may not be used by the users at their places of employment. In some embodiments, electronic devices 110 are included at facilities that are used for collaboratively interacting with the content. These facilities may include commercial movie theaters and/or video conference facilities. Alternately or additionally, electronic devices 110 may be provided in retail establishments. For example, the electronic devices may be located in kiosks. Moreover, the facilities may be dedicated for use by system 100 or may be multi-purpose. Thus, commercial movie theaters may be used to implement electronic devices 110. When used to implement the virtual environment in system 100, these movie theaters may be referred to as 'shopping theaters,' which provide a virtual mall that allows a user to access content associated with multiple products and/or vendors from one location. Furthermore, a variety of services may be provided to the users at such shopping theaters, including: food, information and/or entertainment. Collectively, the user experiences in the shopping theaters may be referred to as 'mall in a room.'

In some embodiments, system 100 is implemented using a centralized architecture, in which signals corresponding to current user actions and/or from content providers 118 are received at optional server 116, and updated signals for display on electronic device 110 (which are determined at optional server 116 based at least in part on the received signals) are subsequently provided by optional server 116. However, in other embodiments, a distributed architecture is used. In these embodiments, each of electronic devices 110 provides signals to the other electronic devices. For example, a given electronic device, such as electronic device 110-1, may provide signals to the other electronic devices corresponding to the actions of a user of electronic device 110-1. Then, each of electronic devices 110 may determine and display the environment, which includes the content and the current user actions.

Note that the content in system 100 may include a variety of data, including: text, audio, music, images, and/or temporal image information (such as an animation sequence or video). Moreover, this data may be compatible with a variety of data formats, including: image formats (such as a Joint Photographic Experts Group standard) and/or video formats (such as a Moving Pictures Expert Group standard).

Figure 2:
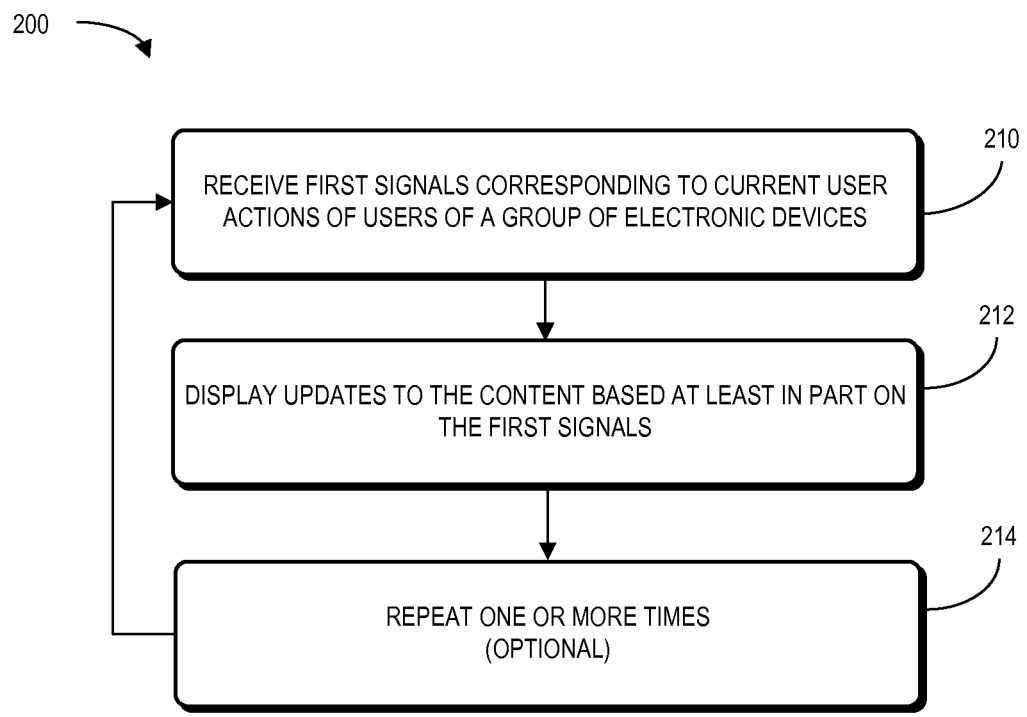
FIG. 2 is a flow chart illustrating a process for collaboratively interacting with content by multiple users of the networked group of electronic devices in FIG. 1 in accordance with an embodiment of the present disclosure.

We now discuss embodiments of a process for collaboratively interacting with content by multiple users of electronic devices 110 in system 100. FIG. 2 presents a flow chart illustrating a process 200 for collaboratively interacting with content by multiple users of electronic devices 110 (FIG. 1). During operation, system 100 (FIG. 1) receives first signals corresponding to current user actions of a given user of a given electronic device, and other users of other electronic devices in the group of electronic devices (210). These current user actions may correspond to collaborative interaction with the content by the users via the group of electronic devices. Then, system 100 (FIG. 1) may display updates to the content in response to the collaborative interaction on the group of electronic devices based at least in part on the first signals (212).

Note that process 200 may include additional or fewer operations. For example, operations 210 and 212 may be optionally repeated (214) one or more times. Moreover, the order of the operations may be changed and/or two or more operations may be combined into a single operation.

Figure 3:
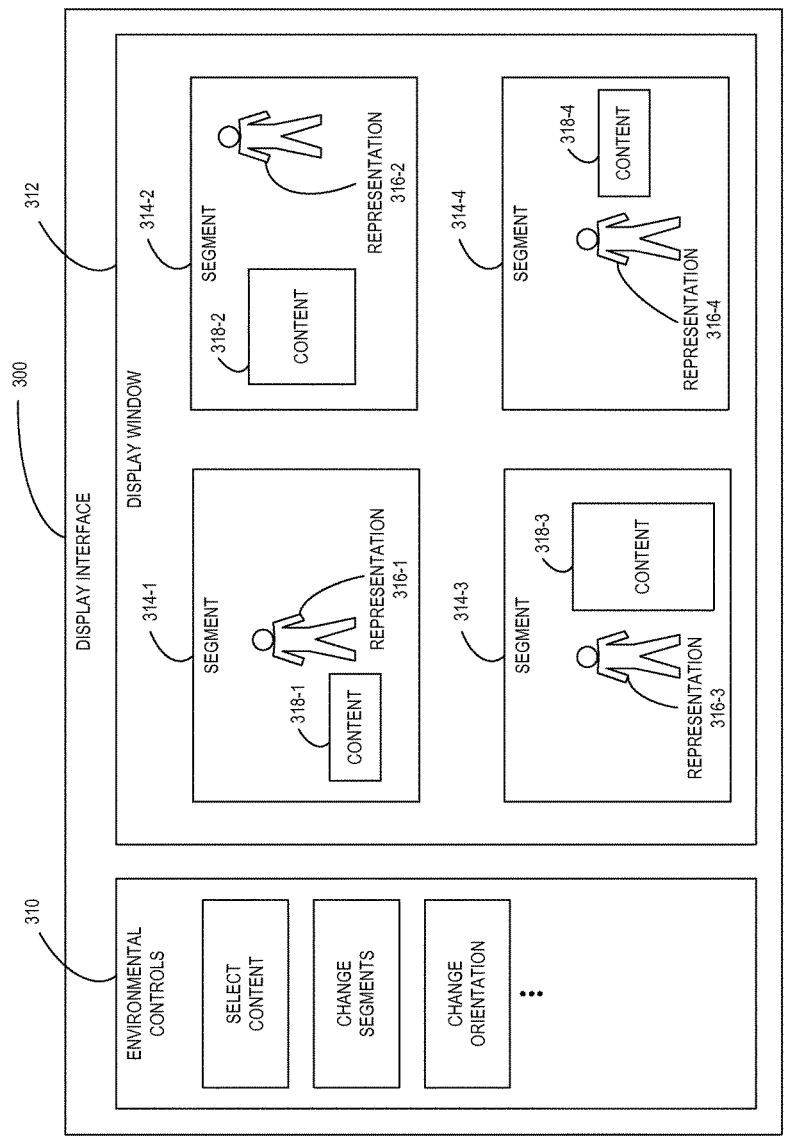
FIG. 3 is a drawing illustrating a display interface on a given electronic device in FIG. 1 in accordance with an embodiment of the present disclosure.

We now describe embodiments of displayed content on a given electronic device in system 100 (FIG. 1). FIG. 3 presents a drawing illustrating a display interface 300 on a given electronic device in FIG. 1. This display interface includes environmental controls 310 and a display window 312, which displays a virtual environment. This environment may be divided into one or more segments 314, a given one of which corresponds to a particular user of one of electronic devices 110 (FIG. 1). Moreover, in these segments, representations 316 of the users (such as animated characters or video images of the users) may be displayed. These representations may be modified or adapted based at least in part on user actions (such as commands provided using environmental controls 310 to change displayed content 318, such as clothing that is current presented in one or more of segments 314) and/or user motions. For example, using environmental controls 310, the given user may: select different content, change the segments 314 that are shown, and/or change the orientation or perspective in one or more of segments 314.

In an exemplary embodiment, system 100 (FIG. 1) shows a user what they would look like wearing a garment in real-time. This user may select an article of clothing from the displayed content 318 using environmental controls 310. Then, the corresponding representation of this user in one of segments 314 may illustrate how the user would look when wearing this article of clothing. Furthermore, as this user moves around the shopping theater, a camera detects their posture and orientation, and the displayed representation in the virtual environment may be updated accordingly.

If there are other users in a group, they may 'go' shopping together. The activities and interests of the various users may be updated in the different segments (which may be displayed on a portion of a display, e.g., in a window, or on separate displays). In this way, the users may be able to see what everyone else in the group is doing. Users may also be able to interact with each other by speaking to each other via a real-time audio link. In addition, one or more of the users may be able to click on one of segments 314 using environmental controls 310, thereby alerting a friend that they are interested in what he or she is doing. Furthermore, if a user double clicks on one of segments 314, it may be expanded to fill the entire display window 312 to allow the user to 'snoop' on their activities more easily.

Alternatively or additionally, there may be a central segment on display window 312 that is surrounded by smaller segments 314. At a given time, this central segment may be used to present one of the user's representations (and the associated content) for all the other users to see. The users may take turns in using this central segment, for example, as they find an article of clothing that they think is interesting.

In some embodiments, system 100 (FIG. 1) determines which of the representations is currently displayed in the central segment. For example, optional server 116 (FIG. 1) may determine that one of the users has found an item or interest based at least in part on how long this user is viewing the item and/or an estimated emotional response of this user to the item. When this occurs, optional server 116 may display the user (or the user's representation) and the item in the central segment.

Figure 4:
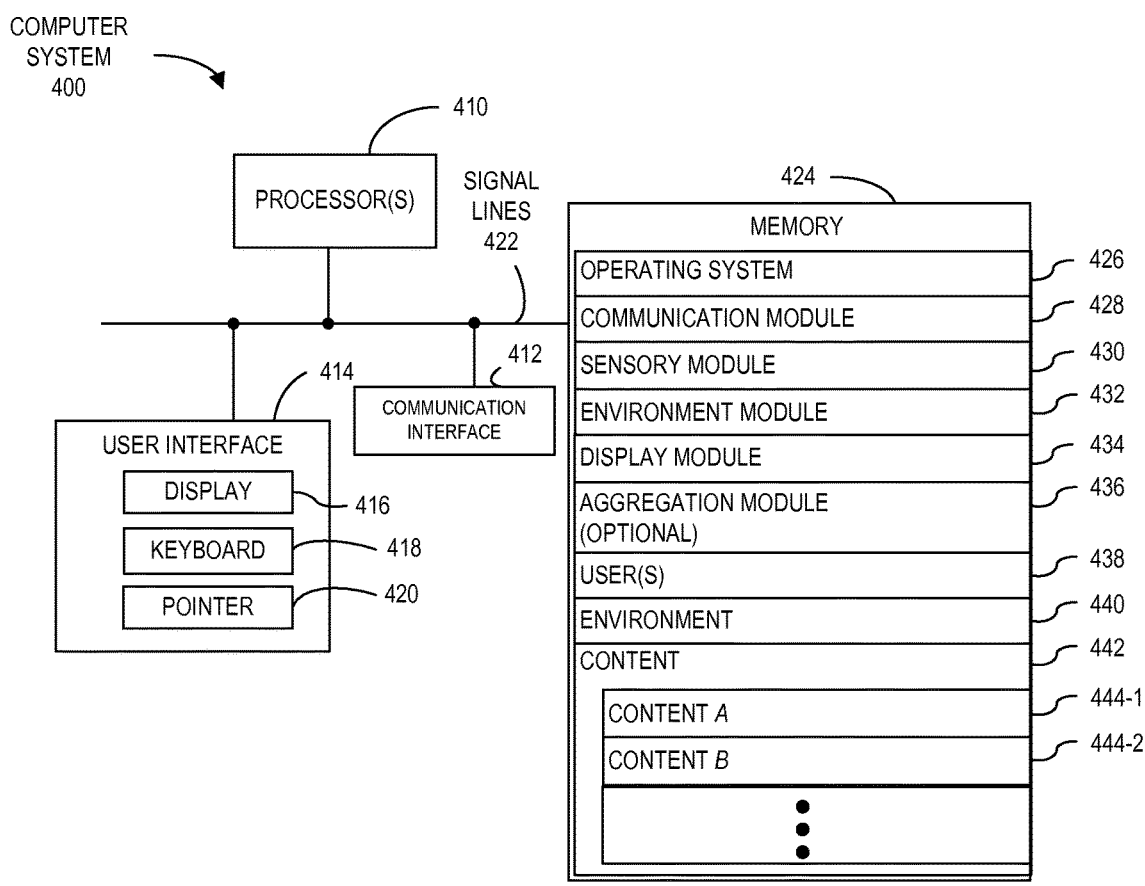
FIG. 4 is a block diagram illustrating a computer system in accordance with an embodiment of the present disclosure.

We now further describe embodiments of a computer system (which may be included in system 100 in FIG. 1) that performs process 200 (FIG. 2). FIG. 4 presents a block diagram illustrating a computer system 400, which may represent optional server 116 (FIG. 1) and/or a given electronic device in system 100 (FIG. 1). Computer system 400 includes: one or more processors 410, a communication interface 412, a user interface 414, and one or more signal lines 422 coupling these components together. Note that the one or more processing units 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in the computer system 400 may include volatile memory and/or non-volatile memory. More specifically, memory 424 may include: ROM, RAM, EPROM, EEPROM, flash, one or more smart cards, one or more magnetic disc storage devices, and/or one or more optical storage devices. Memory 424 may store an operating system 426 that includes procedures (or a set of instructions) for handling various basic system services for performing hardware-dependent tasks. In some embodiments, the operating system 426 is a real-time operating system. While not shown in FIG. 4, in some embodiments memory 424 includes a web browser. Memory 424 may also store communication procedures (or a set of instructions) in a communication module 428. These communication procedures may be used for communicating with one or more computers, devices and/or servers, including computers, devices and/or servers that are remotely located with respect to the computer system 400.

Memory 424 may also include multiple program modules (or sets of instructions), including: sensory module 430 (or a set of instructions), environment module 432 (or a set of instructions), display module 434 (or a set of instructions) and/or optional aggregation module 436 (or a set of instructions). Note that one or more of these program modules may constitute a computer-program mechanism.

Sensory module 430 may receive user actions (such as inputs from environmental controls and/or user motion) from one or more users 438 of electronic devices. Then, environment module 432 may update environment 440 to reflect any changes to accessed content and/or representations of the users. Moreover, display module 434 may provide signals to one or more of the electronic devices which reflect the changes to environment 440.

In some embodiments, the accessed content is received from remote locations, such as servers associated with one or more retailers. However, at least some of the accessed content may be stored locally in computer system 400, for example, in content 442, such as content A 444-1 and content B 444-2.

Furthermore, as noted previously, in some embodiments users 438 are predefined. However, in other embodiments, optional aggregation module 436 dynamically aggregates users 438 as one or more users collaboratively interact with content, such as content 442, using system 100 (FIG. 1).

Instructions in the various modules in memory 424 may be implemented in: a high-level procedural language, an object-oriented programming language, and/or in an assembly or machine language. This programming language may be compiled or interpreted, i.e., configurable or configured, to be executed by the one or more processing units 410.

Although computer system 400 is illustrated as having a number of discrete items, FIG. 4 is intended to be a functional description of the various features that may be present in computer system 400 rather than a structural schematic of the embodiments described herein. In practice, and as recognized by those of ordinary skill in the art, the functions of the computer system 400 may be distributed over a large number of devices or computers, with various groups of the devices or computers performing particular subsets of the functions. In some embodiments, some or all of the functionality of computer system 400 may be implemented in one or more application-specific integrated circuits (ASICs) and/or one or more digital signal processors (DSPs).

Computers and servers in computer system 400 may include one of a variety of devices capable of manipulating computer-readable data or communicating such data between two or more computing systems over a network, including: a computer terminal, a desktop computer, a laptop computer, a server, a mainframe computer, a kiosk, a portable electronic device (such as a cellular phone or PDA), a server and/or a client computer (in a client-server architecture). Moreover, network 114 (FIG. 1) may include: the Internet, World Wide Web (WWW), an intranet, LAN, WAN, MAN, or a combination of networks, or other technology enabling communication between computing systems.

In some embodiments, system 100 (FIG. 1), display interface 300 (FIG. 3) and/or computer system 400 include fewer or additional components. Moreover, two or more components may be combined into a single component and/or a position of one or more components may be changed. Moreover, the functionality of system 100 (FIG. 1), display interface 300 (FIG. 3) and/or computer system 400 may be implemented more in hardware and less in software, or less in hardware and more in software, as is known in the art.

Figure 5:
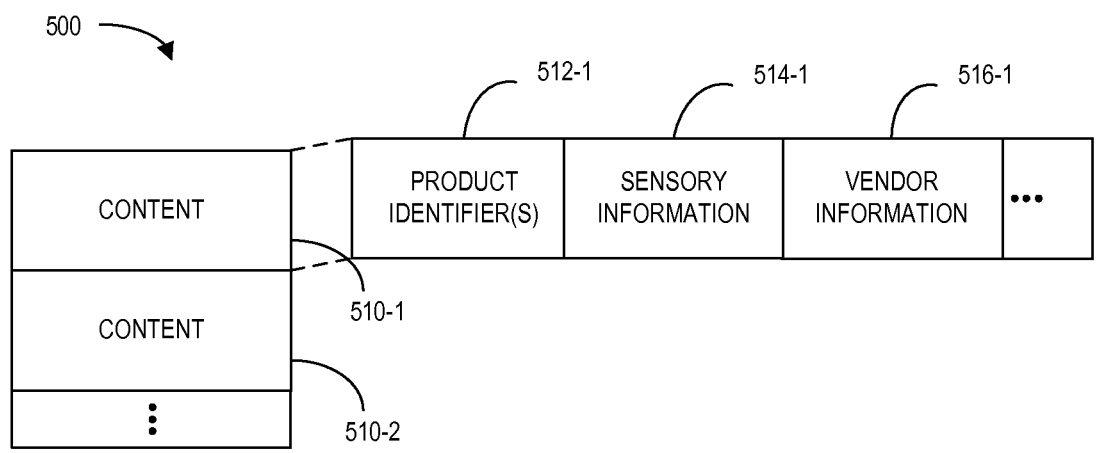
FIG. 5 is a block diagram illustrating a data structure in accordance with an embodiment of the present disclosure.

We now discuss data structures that may be used in computer system 400. FIG. 5 presents a block diagram illustrating a data structure 500. This data structure may contain content 510. For example, content 510-1 may include: one or more product identifiers 512-1 for one or more products, sensory information 514-1 associated with these products (such as images, video, audio, smells, and/or texture information), and/or vendor information 516-1 where users can purchase the products.

In some embodiments, data structure 500 includes fewer or additional components. Moreover, two or more components may be combined into a single component and/or a position of one or more components may be changed.

The foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art. Additionally, the above disclosure is not intended to limit the present disclosure. The scope of the present disclosure is defined by the appended claims.

What is claimed is:

1. A method for multiple users to collaboratively interact with content using a networked group of electronic devices, comprising:
   receiving, by a computing device, first signals corresponding to current user actions of a first user of a first electronic device in the group of electronic devices;
   receiving second signals corresponding to current user actions of a second user of a second electronic device in the group of electronic devices, wherein the current user actions of the first and second users correspond to a collaborative interaction with the content by the first and second users via the group of electronic devices;
   determining, based on the second signals, a time duration that the second user spent viewing a content item; and
   in response to the determined time duration being greater than or equal to a predetermined time threshold:
      generating a visual representation that includes a combination of the second user and the content item to illustrate how the second user would look wearing the content item; and
      providing, to the first user, a display environment that displays the visual representation of the second user and the content item in a central segment of a display window.

2. The method of claim 1, wherein the multiple users are dynamically assembled into a group as the first user interacts with the content.

3. The method of claim 1, wherein the multiple users are at different locations.

4. The method of claim 1, further comprising receiving signals corresponding to user actions at each of the electronic devices in the group of electronic devices.

5. The method of claim 1, wherein the electronic devices in the group of electronic devices are provided at dedicated facilities that are used for collaboratively interacting with the content.

6. The method of claim 5, wherein the dedicated facilities include commercial movie theaters.

7. The method of claim 5, wherein the dedicated facilities include video conference facilities.

8. The method of claim 1, wherein the electronic devices in the group of electronic devices are provided in retail establishments.

9. The method of claim 8, wherein the electronic devices in the group of electronic devices are located in kiosks.

10. The method of claim 1, wherein the user actions include inputs by the users using environmental controls.

11. The method of claim 1, wherein the display environment includes a multi-dimensional virtual environment into which the visual representation of the second user and the content item is projected, and wherein the central segment of the display window is viewed by users of the group of electronic devices.

12. The method of claim 11, wherein the content includes a clothing item or accessory.

13. The method of claim 1, wherein the content includes shopping information.

14. The method of claim 1, wherein the content includes items in a museum.

15. The method of claim 1, wherein the content includes travel information.

16. The method of claim 1, further comprising providing sensory information associated with the content item, wherein the sensory information includes one or more of: a sound, a smell, and tactile information.

17. A computer-program product for use in conjunction with a computer system, the computer-program product comprising a non-transitory computer-readable storage medium and a computer-program mechanism embedded therein to facilitate collaborative interaction with content by multiple users of a networked group of electronic devices, the computer-program mechanism including:
  instructions for receiving first signals corresponding to current user actions of a first user of a first electronic device in the group of electronic devices;
  instructions for receiving second signals corresponding to current user actions of a second user of a second electronic device in the group of electronic devices, wherein the current user actions of the first and second users correspond to a collaborative interaction with the content by the first and second users via the group of electronic devices;
  instructions for determining, based on the second signals, a time duration that the second user spent viewing a content item; and
  instructions for, in response to the determined time duration being greater than or equal to a predetermined time threshold:
    generating a visual representation that includes a combination of the second user and the content item to illustrate how the second user would look wearing the content item; and
    providing, to the first user, a display environment that displays the visual representation of the second user and the content item in a central segment of a display window.

18. A computer system, comprising:
a processor;
memory; and
a program module, wherein the program module is stored in the memory and configured to be executed by the processor, the program module to facilitate collaborative interaction with content by multiple users of a networked group of electronic devices, the program module including:
instructions for receiving first signals corresponding to current user actions of a first user of a first electronic device in the group of electronic devices;
instructions for receiving second signals corresponding to current user actions of a second user of a second electronic device in the group of electronic devices, wherein the current user actions of the first and second users correspond to a collaborative interaction with the content by the first and second users via the group of electronic devices;
instructions for determining, based on the second signals, a time duration the second user spent viewing a content item; and
instructions for, in response to the determined time duration being greater than or equal to a predetermined time threshold:
  generating a visual representation that includes a combination of the second user and the content item to illustrate how the second user would look wearing the content item; and
  providing, to the first user by the first electronic device, a display environment that displays the visual representation of the second user and the content item in a central segment of a display window.

19. The method of claim 1, further comprising:
in response detecting a change in body posture of the second user, changing an appearance of the displayed visual representation to reflect the change in the body posture.

20. The method of claim 1, wherein the content includes content items that are received from multiple remote locations.

* * * * *